US012774774B2

(12) United States Patent
Obermayer et al.

(10) Patent No.: US 12,774,774 B2
(45) Date of Patent: Oct. 27, 2026

(54) MACHINE FRAME, AND FASTENING ASSEMBLY CONSISTING OF A MACHINE FRAME AND AT LEAST ONE FASTENING ELEMENT

(71) Applicant: SOMIC VERPACKUNGSMASCHINEN GMBH & CO. KG, Amerang (DE)

(72) Inventors: Josef Obermayer, Riedering (DE); Josef Lipp, Ramerberg (DE); Matthias Schrott, Trostberg (DE)

(73) Assignee: SOMIC Verpackungsmaschinen GmbH & Co. KG, Amerang (DE)

( * ) Notice: Subject to any disclaimer, the term of this patent is extended or adjusted under 35 U.S.C. 154(b) by 396 days.

(21) Appl. No.: 18/491,001

(22) Filed: Oct. 20, 2023

(65) Prior Publication Data

US 2024/0133509 A1 Apr. 25, 2024
US 2024/0230018 A9 Jul. 11, 2024

(30) Foreign Application Priority Data

Oct. 21, 2022 (EP) .................................... 22202960

(51) Int. Cl.
*F16M 13/00* (2006.01)
*F16M 1/08* (2006.01)

(52) U.S. Cl.
CPC .................................... *F16M 1/08* (2013.01)

(58) Field of Classification Search
CPC .................................. F16M 1/08; F16M 1/00
See application file for complete search history.

(56) References Cited

U.S. PATENT DOCUMENTS 6,206,494 B1 * 3/2001 Benner .................. H02B 1/301 312/265.4
7,726,097 B2 * 6/2010 Ehrmann ............... B65G 21/02 248/676

(Continued)

FOREIGN PATENT DOCUMENTS

DE 202009015918 U1 3/2010
EP 2105649 A1 9/2009

(Continued)

OTHER PUBLICATIONS

European Application No. 22202960, "European Search Report" mailed Mar. 31, 2023, 2 pages.

(Continued)

*Primary Examiner* — Amy J. Sterling
(74) *Attorney, Agent, or Firm* — Kilpatrick Townsend & Stockton LLP

(57) ABSTRACT

The invention relates to a machine frame, such as for a packaging machine, comprising a plurality of supports, specifically at least one longitudinal support and at least one crossbeam. The machine frame according to the invention is characterized in that at least one of the supports is formed by a profile element having an open profile. According to a second aspect the invention relates to a fastening assembly comprising a machine frame according to the invention and at least one fastening element for fastening a functional module to a profile element by engagement in at least one mounting hole.

15 Claims, 7 Drawing Sheets

(56) References Cited

U.S. PATENT DOCUMENTS

Figure 1:
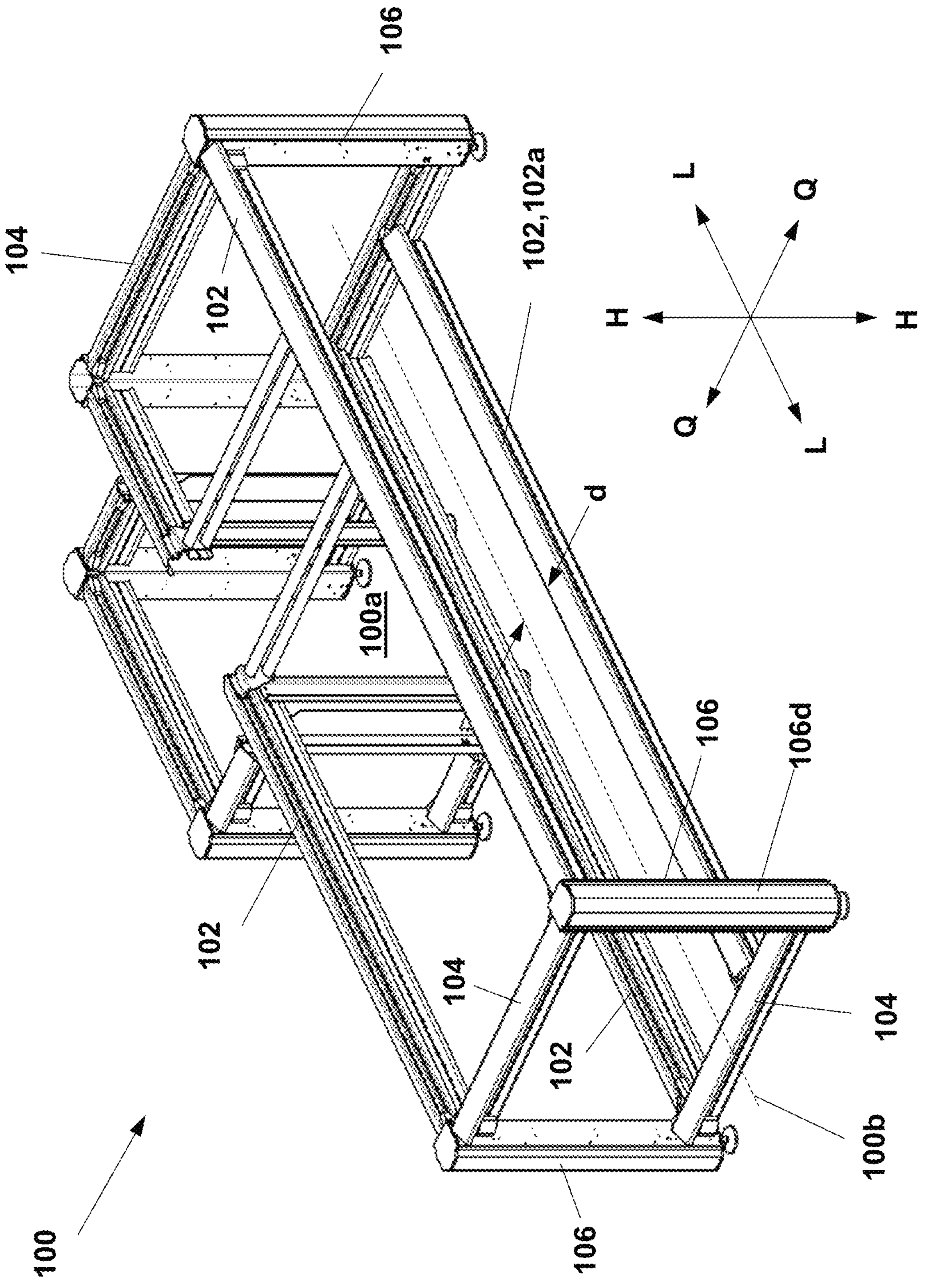

| | | | | |
|---|---|---|---|---|
| 8,292,380 | B2 * | 10/2012 | Fan | H05K 7/183<br>403/217 |
| 10,214,307 | B2 | 2/2019 | Bellante | |
| 12,058,834 | B2 * | 8/2024 | Sy | F16B 7/18 |

FOREIGN PATENT DOCUMENTS

| | | | |
|---|---|---|---|
| EP | 3106401 | A1 | 12/2016 |
| WO | 2019197912 | A1 | 10/2019 |

OTHER PUBLICATIONS

European Patent Application No. 22202960.5, First Examination Report mailed Jun. 23, 2026, 27 pages (English machine translation provided).

* cited by examiner

MACHINE FRAME, AND FASTENING ASSEMBLY CONSISTING OF A MACHINE FRAME AND AT LEAST ONE FASTENING ELEMENT

CROSS REFERENCE TO RELATED APPLICATION

This application claims priority to European Patent Application No. 22202960.5, filed in Europe on Oct. 21, 2022, the entire contents of which are hereby incorporated herein by this reference.

DESCRIPTION

The invention relates to a machine frame, in particular for a packaging machine.

Although the machine frame according to the invention can also be advantageously used in other types of machines, for reasons of more plastic representation it is explained in the following on the basis of the example of a packaging machine.

Packaging machines known from the prior art, in which products or product groups are packaged in a packaging container, for example cardboard, a plastics container, or the like, comprise a machine frame on which the functional modules of the packaging machine required for the packaging are mounted. In a known design, a machine frame of this kind comprises longitudinal supports which extend substantially in parallel with the longitudinal direction of the packaging machine, which substantially coincides with the work progress direction of the packaging machine, crossbeams, which extend substantially in the transverse direction of the packaging machine, i.e. substantially orthogonally to the longitudinal direction, and stands, which extend substantially in the height direction of the packaging machine.

In order to be able to ensure a sufficient rigidity of the machine frame, the longitudinal supports and crossbeams are typically formed of profile elements, such as tubes, extruded profiles, or the like. In order to fasten the crossbeams that support the functional modules, holes are made in said profile elements. This is disadvantageous insofar as, in the event of a modification of the packaging machine which is associated with a displacement of one of the functional modules in the longitudinal direction, apertures remain in the longitudinal support at the previous fastening points of the functional module, through which apertures dust and dirt, and possibly even bugs, can enter the profile element. In order to be able to ensure sufficient hygiene, it is therefore necessary to ensure that all remaining apertures are closed. This is perceived as inconvenient and laborious, and can also impair the flexibility of the arrangement of the functional modules.

Regarding the further prior art, reference is made to EP 3 106 401 A1, WO 2019/197912 A1, and EP 2 105 649 A1.

The object of the present invention is to provide a remedy here.

According to the invention, this object is achieved by a machine frame, in particular a machine frame for a packaging machine, comprising a plurality of supports, specifically at least one longitudinal support and at least one crossbeam, and in which at least one of the supports is formed by a profile element having an open profile.

Since the profile element comprises an open profile element, all the surfaces of the profile element are accessible for cleaning by means of aspirators, blowers, and other cleaning devices. On account of the openness of its profile, the profile element does not exhibit good torsional stiffness with respect to twisting about a direction extending in parallel with the longitudinal axis. However, the inventors have identified that this disadvantage can be overcome by connecting the crossbeams, on which the functional modules are mounted, to the longitudinal supports, such that overall a torsionally stiff machine frame can nonetheless be provided.

In principle, the profile element can be produced from any suitable material. For example, fiber-reinforced composites, metal foams, machine concrete, industrial ceramic and the like can be used for this. However, on account of their production costs, these materials are used predominantly for special applications, for example fiber-reinforced composites, if, in view of measuring devices, particularly high dimensional stability, in particular with little thermal expansion, is important.

In view of the grounding of the machine frame, it is advantageous if the profile element is manufactured from an electrically conductive material. In the most favorable case, the entire machine frame can be considered a single grounding point, such that it needs to be grounded only at one single location. However, it may be necessary, for this purpose, to pierce through a passivation layer, possibly present, on the surface of the profile elements, for example an oxide layer that is present there. In the case of inherently insulating materials being used, a sufficient electrical conductivity can be achieved for example by adding a sufficient number of conductive fibers, for example graphite fibers.

For reasons of cost and/or processing, however, it is preferred, for the vast majority of applications, for the profile element to be manufactured from sheet metal. In view of the stability of the support, the metal sheet can be a steel sheet for example. Steel has the advantage, compared to other metal materials, of having a comparatively high modulus of elasticity at comparatively low initial costs. Compared with aluminum, for example, steel has a modulus of elasticity that is higher by approximately a factor of 3. The steel sheet can for example be a simple steel sheet, which can be galvanized if desired, or a stainless steel sheet. For example, the metal sheet can be a V2A steel sheet, for example a 1.4301 stainless steel sheet. Furthermore, the metal sheet can have a thickness of at least 3 mm.

Uncoated, at most galvanized, sheet steel has the advantage of being inherently conductive. Thus, the profile element can be considered a single grounding point, such that the use of separate grounding cables can be at least reduced, compared with known machine frames, or said cables can be omitted entirely, which further reduces the initial costs and the mounting outlay for the machine frame. In the most favorable case, the grounding of the functional modules can be achieved simply by the fastening of said modules to the profile element.

In order to simplify the production of the profile element, it is further advantageous if it is produced as a bending profile. Furthermore, bending profiles have the advantage that no special molding tools are required for their production. As a result, the initial costs can be reduced, and in addition the number of possible suppliers can be increased, which reduces the acquisition times and increases the acquisition certainty.

In order to be able to ensure a sufficiently high cross-sectional moment of inertia with respect to loads in the height direction, the profile cross section of the open profile extends substantially in the vertical direction over at least 40%, preferably at least 50%, of its total length. Overall, an inherently stable structure of the machine frame, which is torsion-resistant in the manner of the self-supporting body of motor vehicles, can thus be achieved.

In a development of the invention, it is proposed that the cross section of the profile has a substantially horizontally extending support rib on a side facing towards the interior of the machine. This embodiment is advantageous in particular in the case of longitudinal supports. Specifically, the cross-beams, on which the functional modules are mounted, can be placed on this support rib of the profile. Thus, the weight forces of the functional modules can be introduced in a form-fitting manner into the longitudinal support. However, it is also conceivable, in principle, to additionally or alternatively connect the crossbeams to the longitudinal supports in a force-fitting manner.

In order to be able to particularly effectively introduce weight forces into the supports, it is advantageous if a substantially vertically extending rib (also referred to in the following as "inner vertical rib") adjoins the inner end of the support rib, and/or for a substantially vertically extending rib (also referred to in the following as "outer vertical rib") to adjoin the outer end of the support rib.

It is furthermore advantageous if the profile has a rib, extending obliquely downwards and outwards, on its upper end. Firstly, said rib can provide a cross-sectional moment of inertia, which is capable of absorbing loads acting in the horizontal direction, such as arise for example when gantry heads or the like are accelerated and/or braked during or for displacement in the horizontal direction. In addition, said obliquely downwardly and outwardly extending rib can form a roofing under which for example electrical and/or electronic and/or fluidic, for example pneumatic and/or hydraulic, components can be arranged, in order to be able to protect them from dust and/or dirt. On account of the oblique course, dust and dirt can be "shaken off" by the vibrations, occurring during operation of the machine, before it could be deposited on said rib. This is advantageous in particular in the case of hygiene-sensitive applications, for example packaging of food. Furthermore, said oblique "roof" can protect components, arranged thereunder, from damage during mounting and/or repairs and/or due to falling objects and the like.

At this point, it should be noted that components operating with negative pressure are referred to, in connection with the present invention, as fluidic components.

Furthermore, the profile can have a substantially vertically extending rib (also referred to in the following as "lower vertical rib") at its lower end. Said lower vertical rib can also contribute to increasing the cross-sectional moment of inertia of the profile in the height direction. In addition, it can be used both for attaching the above-mentioned electrical and/or electronic components, and of brackets for laying supply lines for the various operating media required at the packaging machine, for example current, compressed air, negative pressure, glue pellets, and the like.

In order to be able to achieve a compact design in the width direction of the profile, the outer vertical rib and the lower vertical rib can be arranged so as to be substantially flush with one another in the vertical direction. In this way, for example the supply lines for the operating media of the machine can be arranged under the support rib.

Furthermore, the inner vertical rib and the lower vertical rib can be connected by a rib that extends obliquely downwards and outwards. The oblique course of said rib makes it possible for a further substantially horizontally extending rib, on which dust and dirt could be deposited, to be avoided. Furthermore, said obliquely extending rib can make a contribution to the cross-sectional moment of inertia, which is capable of absorbing loads acting in the horizontal direction.

Furthermore, the support rib and/or the outer vertical rib and/or the lower vertical rib can comprise a plurality of mounting holes, preferably a hole grid that extends over the entire length of the support. On account of the design of the support as an open profile, the collection of dust and dirt in practice no longer constitutes a problem, compared with the prior art. Therefore, prefabricated mounting holes can be readily provided. If the plurality of mounting holes is designed as a hole grid, i.e. as a plurality of mounting holes which are provided at a predetermined fixed distance from one another, then in the case of a modification of the machine it is not necessary to first make, and previously design, new mounting holes in the profile, which significantly reduces the amount of work associated with the modification.

Advantageously, the mounting holes can be designed as slots which extend in the longitudinal direction of the support. This allows for a particularly flexible fine adjustment of the arrangement of the functional modules. If the slots have a length (based on their extension) of at least 20 mm or a height (based on the usual use orientation of the profile element) of at least 10 mm, then any dirt particles remaining on their edge surface can be easily removed using a conventional cleaning device.

As already mentioned, the machine frame can comprise at least one stand, by means of which the machine frame stands on the floor of a machine hall or a comparable substrate. With respect to the materials suitable for producing the at least one stand, what has been stated above for the materials of the profile element applies identically. For example, at least one of the stands, preferably all the stands, of the machine frame can be formed by a metal angle plate.

If at least one connecting element, which serves to connect a support to a stand or another support, preferably all said connecting elements, is or are manufactured from electrically conductive material, as a result an electrically conductive connection of the different components of the machine frame can be achieved. In the ideal case, this makes it possible, for example, to ground the machine frame as a whole, i.e. by means of a single grounding cable. The entire machine frame quasi becomes a single ground or grounding point.

The at least one connecting element can for example be manufactured from bronze and/or brass and/or copper and/or steel, for example stainless steel, and/or aluminum, for example surface-passivated, aluminum.

Furthermore, the at least one connecting element can be connected to the support and the stand, or the supports, by means of screwing.

In order to facilitate the access to the machine for the maintenance personnel, and thus to be able to reduce the risk of injury during maintenance, it can furthermore be provided that a lower substantially horizontally extending longitudinal support of the machine frame is arranged so as to be offset from the longitudinal center of the machine frame by a predetermined distance. In this way, the maintenance personnel do not have to cross said longitudinal support during maintenance work, in order to be able to access components in the interior of the machine.

According to a further aspect, the present invention relates to a fastening assembly, which comprises a machine frame according to the first aspect of the invention and at least one fastening element for fastening a functional module to a profile element by engagement in at least one mounting hole, the fastening element comprising at least one hook part having a reach-through portion and a hook portion, the reach-through portion being intended for passing through the mounting hole and being of a height which is less than the height of the mounting hole, the hook portion being intended for engaging behind the mounting hole and being of a predetermined height, the sum of the height of the reach-through portion and the height of the hook portion being greater than the height of the mounting hole, the at least one hook part further comprising a contact portion which is intended to come into contact engagement with a first contact surface of the profile element, the fastening element comprising at least one clamping part which interacts with the at least one hook part and is adjustable, relative thereto, between a clamping position and a release position, and the at least one clamping part being intended to come into contact engagement with a second contact surface of the profile element, in the clamping position, in such a way that the contact portion of the at least one hook part comes into contact engagement with the first contact surface of the profile element and thus secures the engagement of the reach-through portion in the mounting hole and the engagement of the hook portion behind the mounting hole.

The fastening assembly according to the invention, more precisely the interaction of the machine frame according to the invention with the at least one fastening element, facilitates the attachment and the positioning of functional modules. A change in position of the fastening element, in particular an unintended release from the mounting hole, is prevented by the clamping part.

For fastening, a fastening element, the clamping part of which is in the release position, is introduced into the mounting hole until the at least one hook part engages behind the mounting hole. In this case, the reach-through portion rests on a contact point on the side of the clamping part on the edge of the mounting hole that is on the hook portion side, in the height direction. By increasingly adjusting the clamping part into the clamping position, the fastening element is then rotated about the contact point until the contact portion of the hook part comes into engagement with the first contact surface of the profile element. In said position, which corresponds to the clamping position of the clamping part, the reach-through portion extends entirely inside the mounting hole and can rest on the boundary surface of the mounting hole in the height direction. However, at its upper side, it can also be at a predetermined, preferably small, spacing from an upper portion of the boundary surface of the mounting hole.

In order that the fastening element does not collide with the profile element during the rotation about the contact point, in a development of the second concept of the invention it is proposed for the hook part to be arranged completely inside a notional circle, the center of which forms the contact point, and the radius of which is equal to the height of the mounting hole. It is thus possible to reliably prevent the outside contour of the hook part from colliding with the upper portion of the boundary surface of the mounting hole during the rotational movement.

In order to release the fastening element from the profile element, the clamping part is transferred from the clamping position back into the release position. Subsequently, the fastening element can be removed from the mounting hole by rotation about the contact point.

At this point it is noted that, in the case of a fastening element that passes through a mounting hole in the clamping position, the height of the reach-through portion and the height of the hook portion extend in the same direction as the height of the mounting hole. The longitudinal direction of the fastening element also corresponds to the longitudinal direction of the mounting hole, when the fastening element passes through the mounting hole in the clamping position. The reach-through direction extends orthogonally to the height direction and the longitudinal direction. In other words, the reach-through direction of a fastening element extends through the mounting hole, in the clamping position.

Preferably, the first contact surface of the profile element and the second contact surface of the profile element are arranged on surfaces of the profile element that face away from one another.

For improved positioning of the fastening element and for securing the fastening element in all three directions, a contact surface can be provided on a base part of the fastening element, which contact surface comes into contact engagement with a third contact surface of the profile element, it preferably being possible for the third contact surface of the profile element to be arranged on the same side of the profile element as the second contact surface, and it further preferably being possible for the third contact surface of the profile element and the first contact surface to be arranged on surfaces of the mounting hole facing away from one another.

Preferably, the reach-through portion is arranged between the hook portion and the projection portion, in the reach-through direction.

Since in particular the at least one hook part can be subjected to high loads, it has been found to be advantageous for the fastening element to comprise a plurality of hook parts. Thus, the load can be distributed and breaking of the hook part can be compensated.

Furthermore, the fastening element can comprise a plurality of clamping parts. As a result, the fastening element is braced, with the profile element, on a plurality of contact surfaces, such that the risk of the fastening element slipping is further reduced.

The outlay for mounting a fastening element on a machine frame can be further reduced in that at least one clamping part is formed by a screw. Advantageously, all the clamping parts are formed by screws. After the reach-through portion has passed through the mounting hole, the screw can be screwed in until it comes into contact engagement with the second contact surface of the profile element. After the screw touches the second contact surface, it can be screwed in yet further, such that the resulting torque braces the fastening element with the profile element. In order to avoid overtightening of the screw and damage to the profile element, the screw can be tightened with a nominal torque. Loosening the screw makes it possible for this to be easily returned into the release position again.

The screw can thus be easily inserted or screwed in from the front side. Furthermore, a locking nut or introduction of a thread into the profile element is not required, which significantly simplifies the construction of the machine frame compared with conventional machine frames, both in production and in use.

With respect to the materials suitable for producing the fastening element, what has been discussed above for the materials of the profile element applies identically. In order to simplify the production, and to reduce the production costs, the fastening element can be produced for example as a bending element. Preferably, the fastening element can be produced as a lasered stainless steel bending element, or as a stamped bending element.

Figure 2:
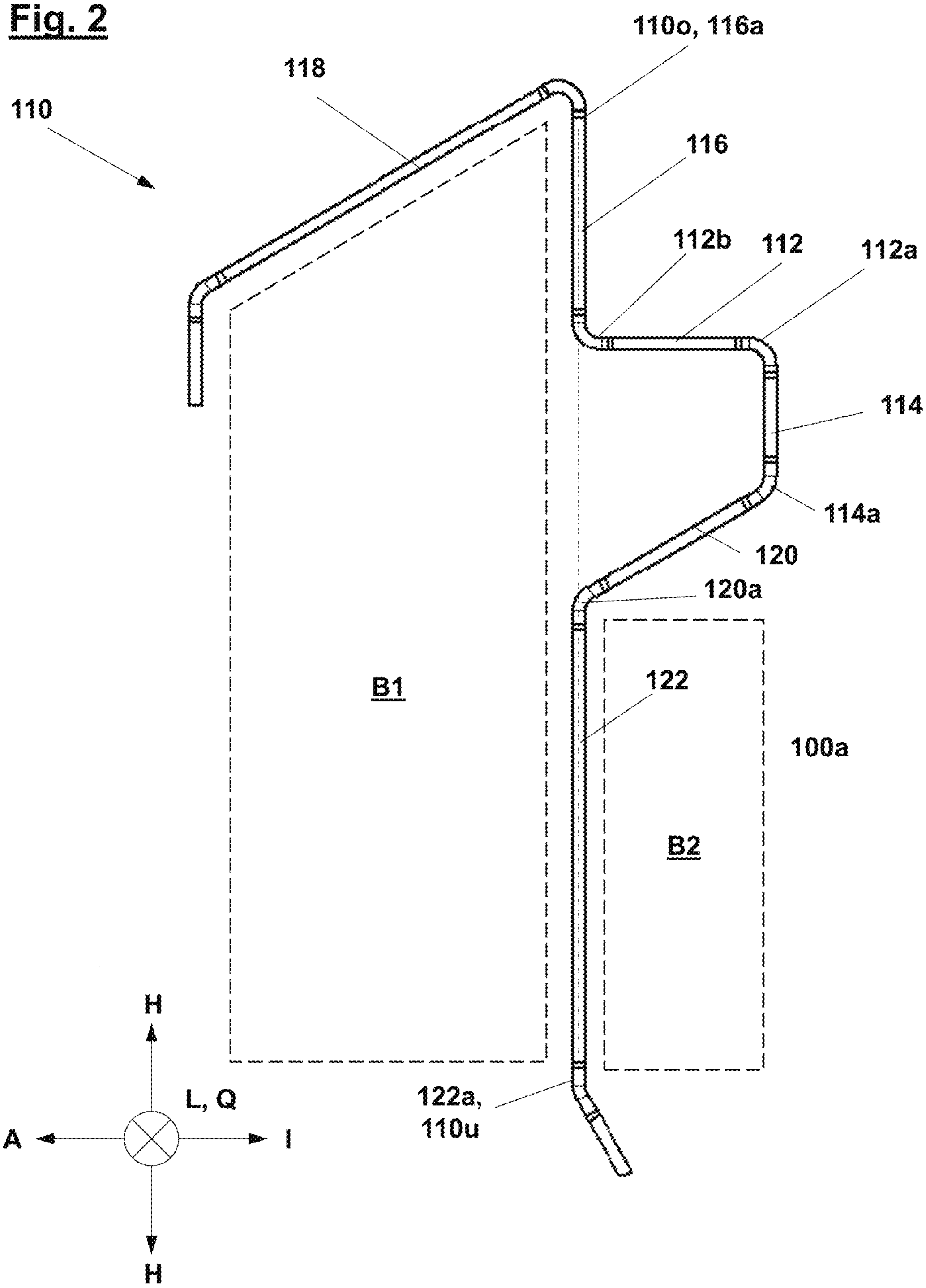
Figure 3:
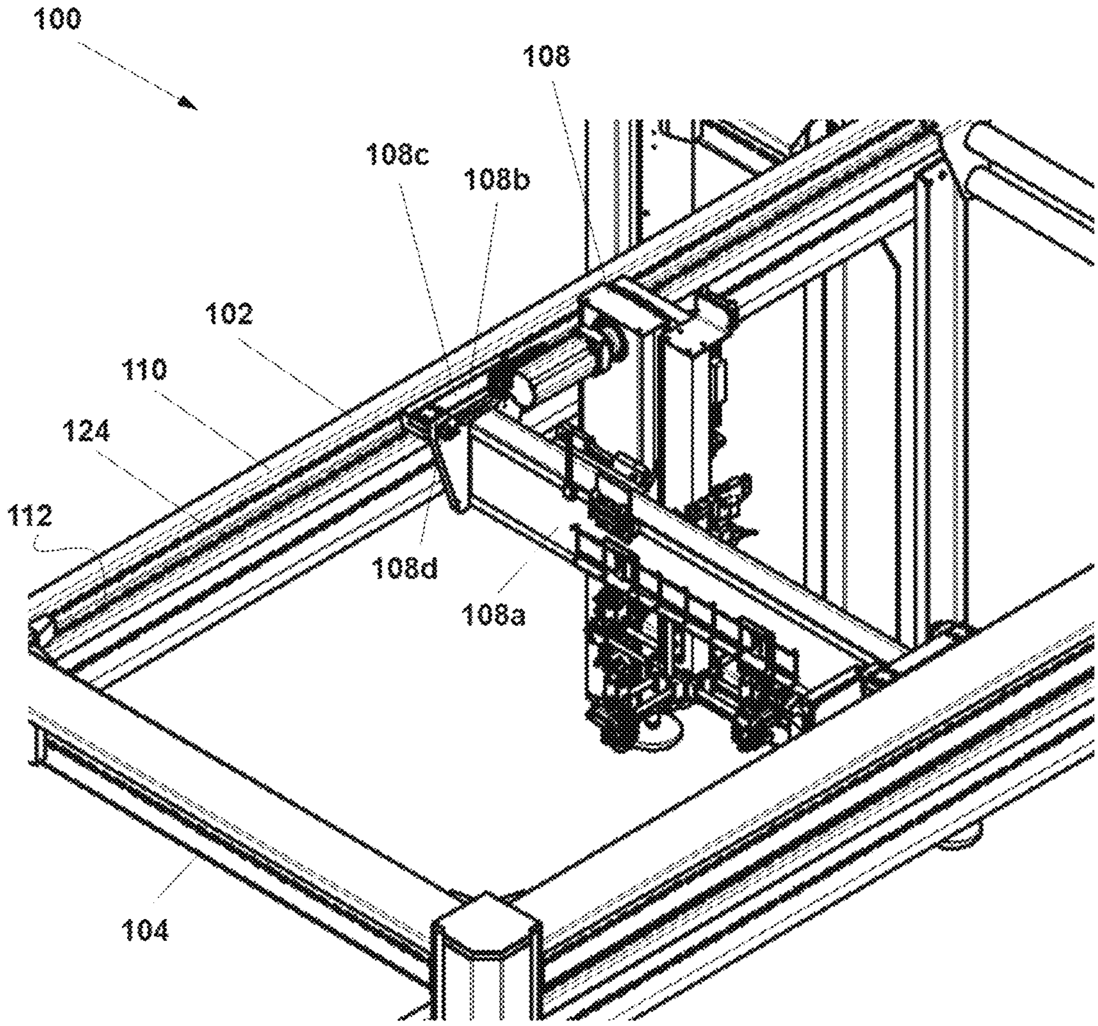
Figure 4B:
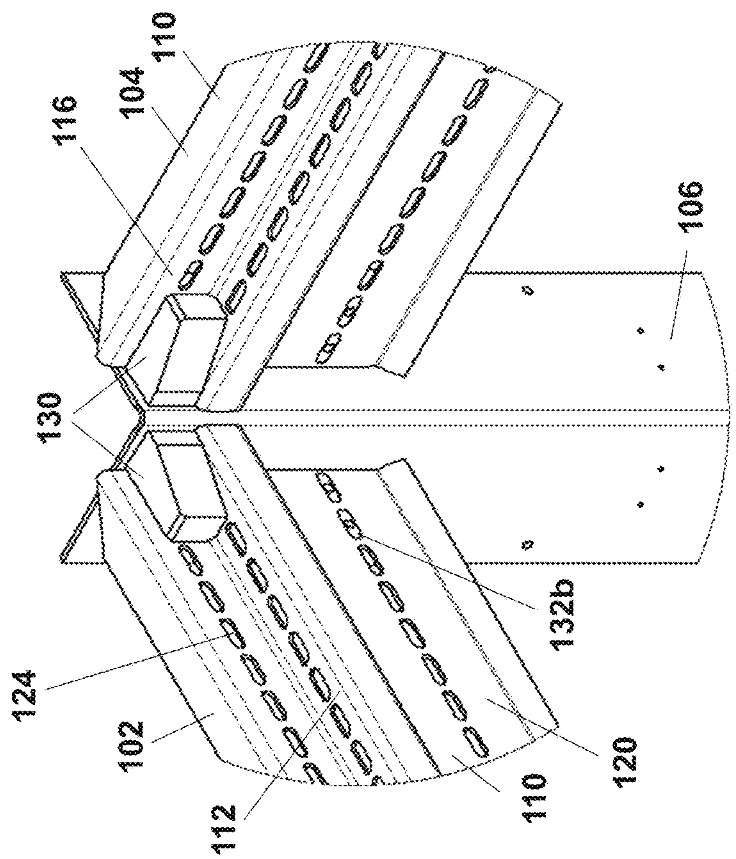
Figure 4A:
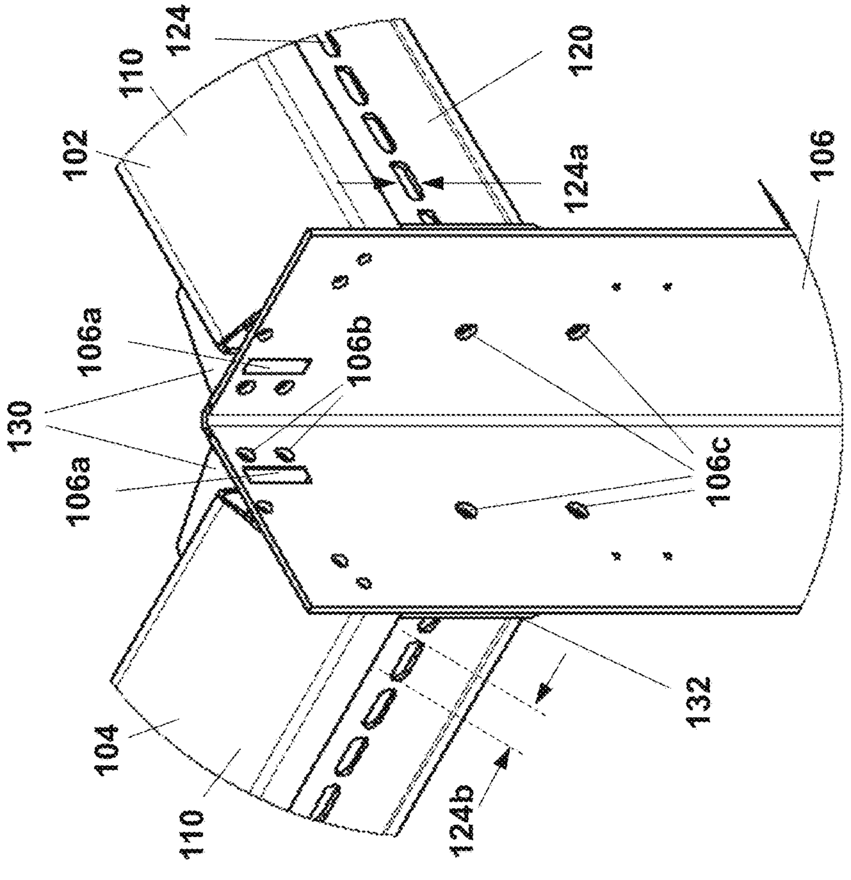
Figure 5A:
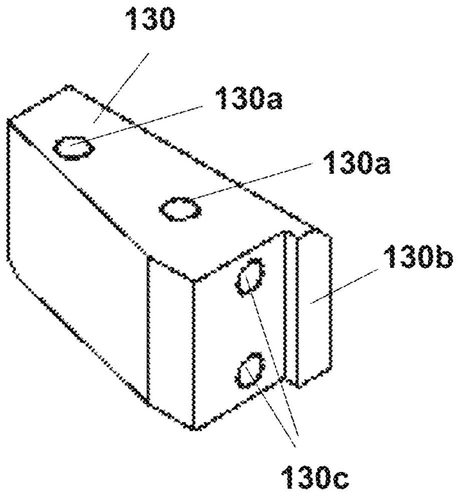
Figure 5B:
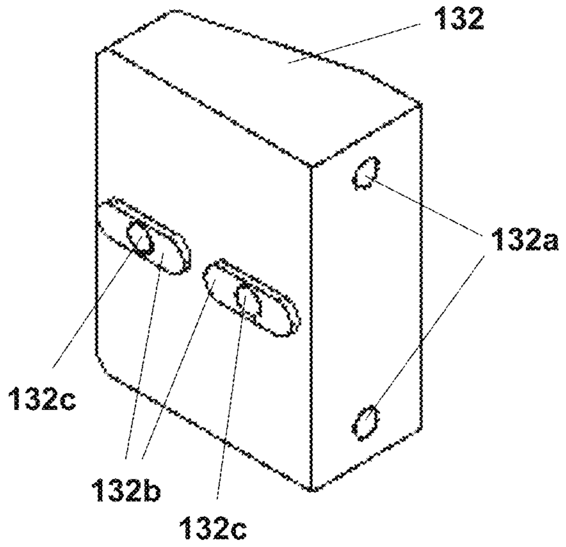
Figure 6:
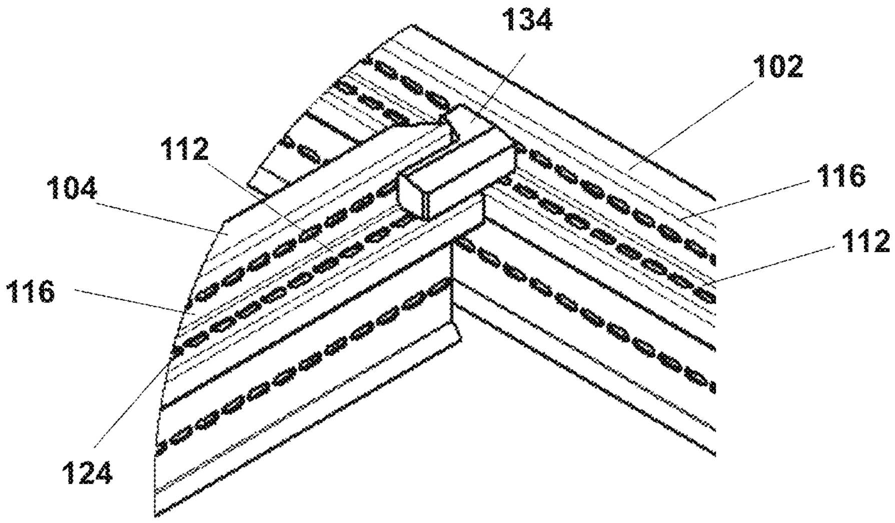
Figure 7B:
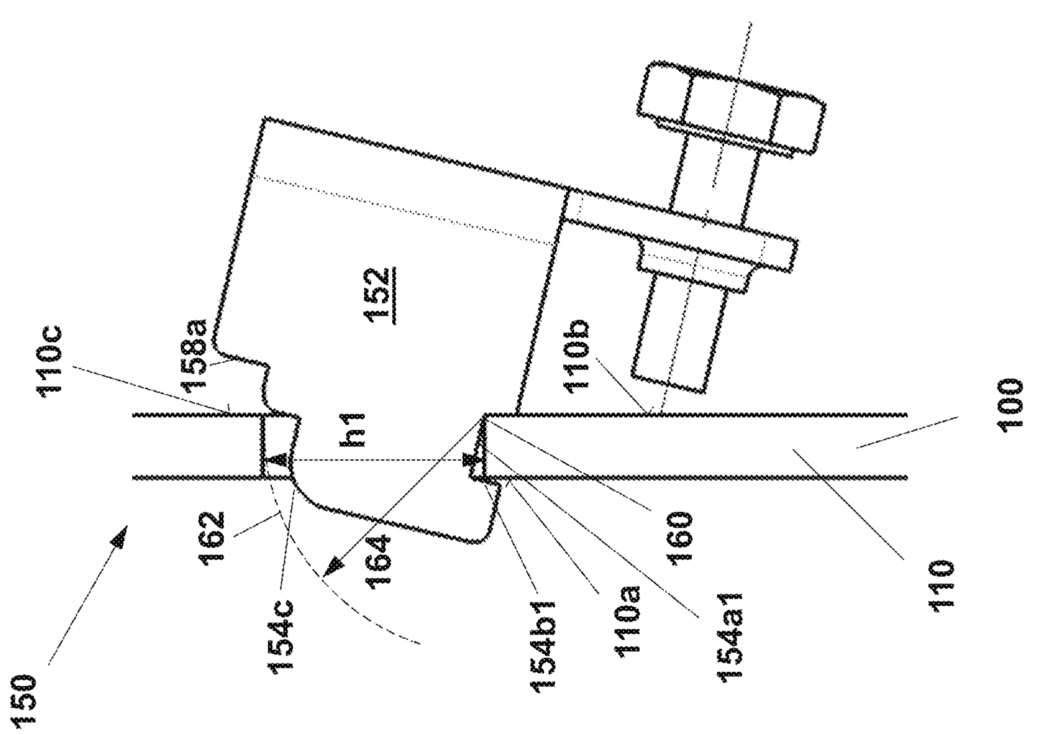
Figure 7A:
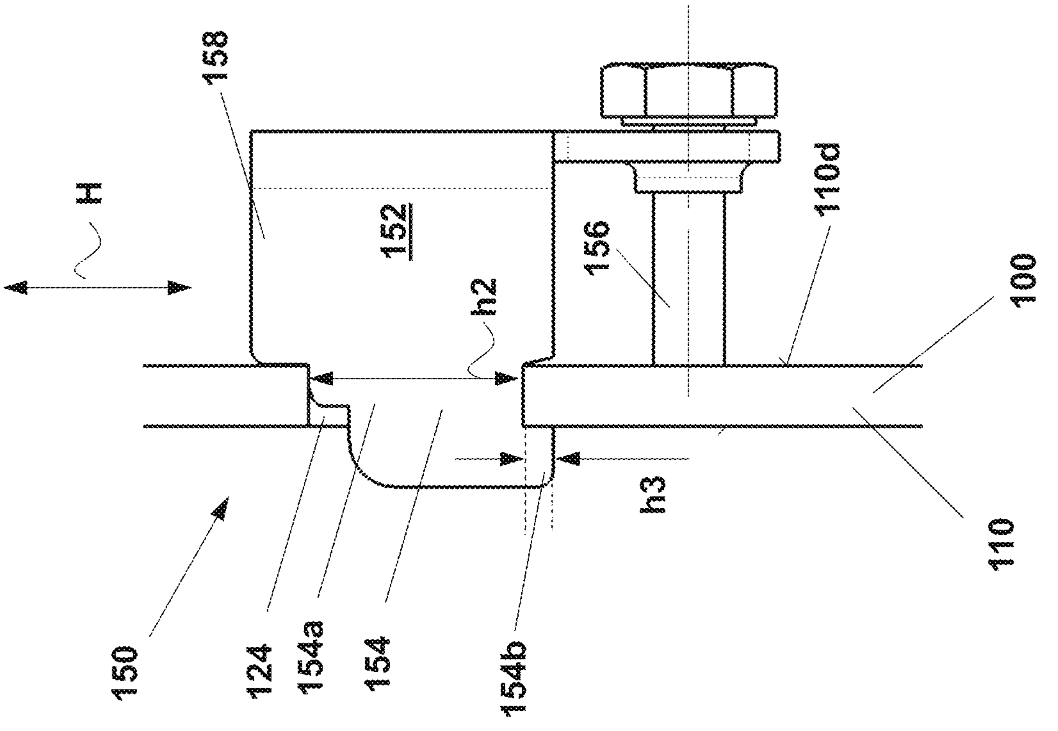
Figure 8A:
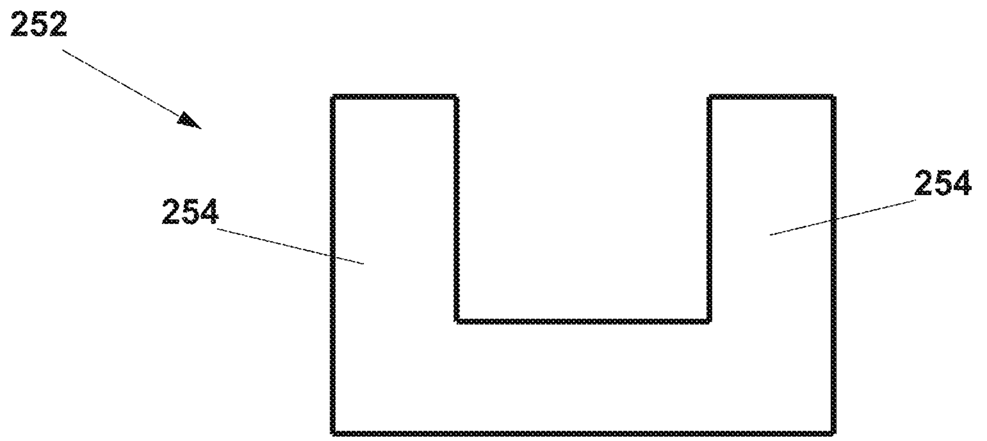
Figure 8B:
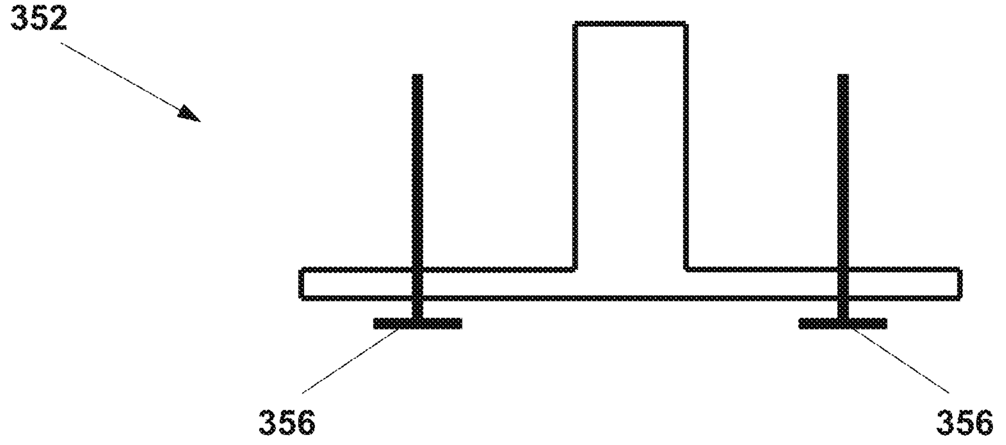

The invention will be explained in greater detail in the following, on the basis of embodiments and with reference to the accompanying drawings, in which:

FIG. 1 is a perspective view of a machine frame according to the invention,

FIG. 2 is a cross-sectional view of a sheet metal profile according to the invention, FIG. 3 is a detail view of the machine frame comprising a crossbeam which supports a functional module, FIGS. 4*a* and 4*b* are detail views for explaining the connection of a stand of the machine frame, and with its longitudinal supports and crossbeams, FIGS. 5*a* and 5*b* are schematic views of different embodiments of connecting elements, FIG. 6 is a detail view of a connection point of a crossbeam to a longitudinal support of the machine frame, FIGS. 7*a* and 7*b* are schematic views for explaining the interaction of a fastening element with a mounting hole of a profile element of the machine frame, and FIGS. 8*a* and 8*b* are schematic views of further embodiments of fastening elements.

In FIG. 1, a machine frame is denoted very generally by 100. The machine frame 100 comprises a plurality of supports, specifically a plurality of longitudinal supports 102 and a plurality of crossbeams 104. The machine frame 100 further comprises a plurality of stands 106. Connecting the stands 106 to the longitudinal supports 102, to the crossbeams 104, and to further crossbeams of functional modules 108 (see FIG. 3), results in a machine frame 100 that is torsionally stiff overall.

For the sake of completeness, it is noted that the longitudinal supports 102 extend in the longitudinal direction L of the machine frame 100, the crossbeams 104 extend in the transverse direction Q of the machine frame 100, and the stands 104 extend in the height direction H of the machine frame 100.

The longitudinal supports 102, the crossbeams 104, and the stands 106 define an interior 100*a* of the machine frame 100 in which the functional modules of a machine (not shown), for example a packaging machine, can be arranged. The work progress direction of the machine typically extends in parallel with the longitudinal direction L of the machine frame 100.

In the embodiment shown, the longitudinal supports 102 and the crossbeams 104 are all formed by a profile element 110 which has an open profile (see FIG. 2).

Although in principle the profile element 110 can be produced from any suitable material, according to the present embodiment all the supports 102, 104 are manufactured from sheet metal, in particular sheet steel, preferably 1.4301 stainless steel sheet, and produced as bending profiles.

FIG. 2 is a cross-sectional view of the profile element 110 along the longitudinal direction L and the transverse direction Q, respectively. In FIG. 2, the "inward" direction facing towards the interior 100*a* of the machine frame 100 is denoted by I, and the "outward" direction facing away from the interior 100*a* is denoted by A.

The single substantially horizontally extending portion of the profile element 110 forms a support rib 112. As shown in FIG. 3, the crossbeam 108*a* of a functional module 108 of the machine mounted in the machine frame 100 can rest on the support rib 112 of a longitudinal support 102. The support rib 112 thus serves to introduce the weight forces of the functional module 108 into the machine frame 100.

A substantially vertically extending rib 114 (inner vertical rib 114) adjoins the support rib 112 at the inner end 112*a* of the support rib 112. A substantially vertically extending rib 116 (outer vertical rib 116) adjoins the support rib 112 at the outer end 112*b* of the support rib 112.

In the embodiment shown, an upper end 116*a* of the outer vertical rib 116 forms an upper end 110*o* of the profile element 110. A rib 118 that extends obliquely downwards and outwards adjoins the upper end 116*a* of the outer vertical rib 116. Electrical and/or electronic and/or fluidic, for example pneumatic and/or hydraulic, components can be arranged below said rib 118 that extends obliquely downwards and outwards, in the region B1 indicated by dashed lines. Said components are protected from dust and/or dirt by the rib 118 that extends obliquely downwards and outwards.

A further rib 120 that extends obliquely downwards and outwards adjoins the lower end 114*a* of the inner vertical rib 114. For example, electrical and/or fluidic supply lines and/or data lines, which serve for supplying and/or controlling the components arranged in the region B1 can be arranged in a region B2, indicated by dashed lines, below said rib 120.

The termination is formed by a further vertical rib 122 (lower vertical rib 122) that adjoins the lower end 120*a* of the obliquely extending rib 120. Inter alia the above-mentioned components and lines can be attached to the lower vertical rib 122. The lower end 122*a* of the lower vertical rib 122 forms the lower end 110*u* of the profile element 100.

It should be added that the outer vertical rib 116 and the lower vertical rib 122 are arranged so as to be substantially flush with respect to one another in the height direction H, as indicated by a dot-dashed line in FIG. 2.

It should further be added that the inner vertical rib 114, the outer vertical rib 116, and the lower vertical rib 122 together extend over at least 40% of the total length of the profile element 110. This ensures a sufficient vertical rigidity of the profile element 110 with respect to loads acting thereon in the height direction H. The transverse rigidity is provided by the two obliquely extending ribs 118 and 120, as well as the additional stiffening by the crossbeams of the functional modules 108 fastened to the longitudinal supports 102.

FIG. 3 is a detail of a machine frame 100 comprising a functional module 108. In this case, the exact design and the exact function of the functional module is not important in connection with the present invention. Rather, in FIG. 3 what is important is the way in which the functional module 108 is fastened to the longitudinal supports 102 of the machine frame.

As is shown in particular in FIG. 4*b*, in each case a plurality of mounting holes 124 is provided in the support rib 112, in the outer vertical rib 116, and in the lower vertical rib 120. Said mounting holes 124 are formed as a hole grid which extends over the entire length of the longitudinal support 102 or of the crossbeam 104. Furthermore, the plurality of mounting holes 124 is formed as slots extending in the longitudinal extension direction of the respective support 102 or 104. The slots have a height 124*a* extending in the height direction H, and a length 124*b* extending along the respective longitudinal extension direction. The plurality of slots 124 preferably has a height 124*a* of at least 10 mm in each case, and a length 124*b* of at least 20 mm in each case.

According to FIG. 3, the crossbeam 108*a* of the functional module 108 comprises an end unit 108*b* having a shoulder 108*c* that extends substantially horizontally. By means of said shoulder 108*c* the end unit 108*b*, and, therewith, the entire functional module 108, rests on the support rib 112 of the longitudinal support 102. Optionally, pins (not shown) can be provided on the underside of the shoulder 108*c*, by means of which pins said shoulder engages in a form-fitting manner in mounting holes 124 of the support rib 112. Furthermore, fastening bolts 108*d* can be seen in FIG. 3, which pass through the mounting holes 124 of the outer vertical rib 116 such that the shoulder 108*b* and, therewith, the entire functional unit 108, can be screwed to the longitudinal support 102.

With reference to FIGS. 4*a* and 4*b*, and 5*a* and 5*b*, the longitudinal supports 102 and the crossbeams 104 are connected to the stands 106 by means of connecting elements 130 and 132. Preferably all the connecting elements 130, 132 are manufactured from an electrically conductive material.

The connecting element 130 shown in detail in FIG. 5*a* is intended to be arranged on the inside of the profile element 110. In particular, the connecting element 130 is placed on the support rib 112 of the profile element 110 and can be fastened thereto by means of fastening bolts (not shown), which pass through corresponding through-holes 130*a* (see FIG. 5*a*) and mounting holes 124 of the support rib 112. Furthermore, the connecting element 130 comprises a projection 130*b* which engages in a corresponding opening 106*a* of the stand 106 (see FIG. 4*a*). Furthermore, the stand 106 comprises, beside each of the openings 106*a*, two drilled holes 106*b*, and the connecting elements 130 comprise two corresponding threaded drilled holes 130*c*, which serve for fastening the connecting elements 130 on the stand 106 by means of threaded bolts (not shown).

The connecting element 132 shown in detail in FIG. 5*b* is intended to be arranged on the outside of the profile element 110. In particular, the connecting element 132 comprises two threaded drilled holes 132*a*, which serve for fastening the connecting elements 132 on the stand 106 by means of threaded bolts (not shown) which pass through corresponding drilled holes 106*c* of the stand 106. Furthermore, the connecting element 132 comprises two projections 132*b*, which are designed such that they can be inserted in a form-fitting manner in associated mounting holes 124 of the lower vertical rib 120 without protruding out of the mounting holes 124 on the other side. Furthermore, threaded drilled holes 132*c* are formed in the projections 132*b*, which serve for fastening the connecting element 132 to the lower vertical rib 120 by means of threaded bolts (not shown).

As shown in FIG. 6, the longitudinal supports 102 and the crossbeams 104 can be connected to one another, also directly, via a substantially L-shaped connecting element 134. With respect to the arrangement, the connecting element 134 is similar to the connecting element 130, since, like this connecting element, it can be placed on the support ribs 112 both of the longitudinal support 102 and of the crossbeam 104, and be fastened to these by fastening bolts (not shown).

Regarding FIG. 1, it should also be added that the stands 106 can be provided, on the side thereof visible from the outside, with a casing 106*d*. Said casing can serve as protection against environmental influences or to prevent damage or injury, but, by virtue of a special shaping and coloring, can also be used for design purposes.

Furthermore, it should be added with regard to FIG. 1 that one of the lower longitudinal supports 102 of the machine frame 100 (denoted 102*a* in FIG. 1) can be arranged so as to be offset towards the longitudinal center 100*b* of the machine frame 100 by a predetermined distance d. This facilitates access, for the maintenance and/or operating personnel, to the functional units 108, since it is not necessary to cross the longitudinal support for this purpose.

According to a second aspect, the invention relates to a fastening assembly 150, as is shown by way of example in FIGS. 7*a* and 7*b*. The fastening assembly 150 comprises the machine frame 100 and at least one fastening element 152, to which further elements, for example functional modules 108, can be fastened.

The fastening element 152 is designed in a manner adapted to the mounting holes 124 of the profile elements 110 of the machine frame 100. In particular, the fastening element 152 comprises a hook part 154 having a reach-through portion 154*a* and a hook portion 154*b*.

The reach-through portion 154*a* is intended to pass through the mounting hole 124, as shown in FIG. 7*a*. Furthermore, the reach-through portion 154*a* is of a height h2 that is smaller, preferably only slightly smaller, for example less than 1 mm smaller, than the height h1 of the mounting hole 124. In principle it is also conceivable that the heights h1 and h2 are substantially the same, taking into account the tolerances, such that the reach-through is designed as a transition fit. Thus, easy clamping between the fastening element 152 and the profile element 110 can be achieved, already after screwing in the fastening element 152.

The hook portion 154*b* is intended to engage behind the mounting hole 124 in a form-fitting manner. The hook portion 154*b* has a predetermined height h3 in the height direction H. The sum of the height h2 of the reach-through portion 154*a* and the predetermined height h3 of the hook portion 154*b* is greater than the height h1 of the mounting hole 124. As a result, when the fastening element 152 is located in the mounted position shown in FIG. 7*a*, it cannot be drawn out of the mounting hole 124 (to the right in FIG. 7*a*), since a contact surface 154*b*1 of the hook portion 154*b* (see FIG. 7*b*) still interacts with a first contact surface 110*a* of the profile element 110 even if the reach-through portion 154*a* should be pushed fully upwards in the mounting hole 124.

Furthermore, the fastening element 152 comprises at least one clamping part 156 which interacts with the at least one hook part 154 and is adjustable relative to the hook part 154 between a clamping position (see FIG. 7*a*) and a release position (see FIG. 7*b*). The clamping part 156 is intended to come into contact engagement with a second contact surface 110*b* of the profile element 110, in the clamping position, in such a way that the contact surface 154*b*1 of the hook portion 154*b* comes into contact engagement with the contact surface 110*a* of the profile element 110. This secures the engagement of the reach-through portion 154*a* in the mounting hole 124, and the engagement of the hook portion 154*b* behind the mounting hole 124.

In the clamping position shown in FIG. 7*a*, the position stability of the fastening element 152 can be further increased in that a contact surface 158*a* is provided on a base part 158 of the fastening element 152, which contact surface can come into contact engagement with a third contact surface 110*c* of the profile element 110. As can be seen from FIGS. 7*a* and 7*b*, the second contact surface 110*b* and the third contact surface 110*c* are arranged on the same side 110*d* of the profile element 110. Furthermore, the first contact surface 110*a* and the third contact surface 110*c* are arranged on sides of the mounting hole 124 that are different from one another in the height direction H.

Prior to the attachment of the fastening element 152, the clamping part 156 is located in its release position (FIG. 7*b*). The fastening element 152 is guided, with the hook portion 154*b* at the front, through the mounting hole 124 until the reach-through portion 154*a* rests, with its surface 154*a*1 on the hook portion side, against a contact point 160 on the mounting hole 124. The contact point 160 is arranged, in the height direction H, on the same side as the first contact surface 110*a*. In addition, the contact point 160 is located on the side 110*d* of the profile element 110.

In order to transfer the fastening element 152 into its mounted position, the fastening element 152 is rotated about the contact point 160 until the contact surface 154*b*1 of the hook portion 154*b* rests on the first contact surface 110*a* of the profile element 110.

In order to allow this rotational movement, the hook part 154 has an outer contour 154*c* which is located inside a notional circle line 162 (shown by a dashed line in FIG. 7*b*). The circle line 162 has a radius 164 which is equal to the height h1 of the mounting hole 124. The center of the circle line 162 is the contact point 160.

After the rotation of the fastening element 152 about the contact point 160, not only do the contact surfaces 154*b*1 and 110*a* rest against one another, but rather also the contact surfaces 158*a* and 110*c*, as a result of which the fastening element 152 is secured in two directions.

Subsequently, the clamping part 156 can be transferred into the clamping position (FIG. 7*a*). In this case, the clamping part 156 rests on the second contact surface 110*b* of the profile element 110. The position of the hook portion 152 is secured as a result.

FIG. 8*a* schematically shows a further embodiment of a fastening element 252 comprising a plurality of hook parts 254.

FIG. 8*b* schematically shows a further embodiment of a fastening element 352 which comprises a plurality of clamping parts 356.

The invention claimed is:

1. Machine frame comprising a plurality of supports, wherein the plurality of supports comprises at least one longitudinal support and at least one crossbeam, wherein at least one of the supports is formed by a profile element having an open profile, and wherein the profile cross section of the open profile extends substantially in a vertical direction over at least 40% of its total length, wherein the profile has a rib, at its lower end, that extends substantially vertically, and wherein an outer vertical rib and a lower vertical rib are arranged so as to be substantially flush with respect to one another in the vertical direction, and/or in that an inner vertical rib and a lower vertical rib are connected by a support rib that extends obliquely downwards and outwards.

2. Machine frame according to claim 1, wherein the profile element is manufactured from sheet metal.

3. Machine frame according to claim 1, wherein the profile element is produced from a bending profile.

4. Machine frame according to claim 1, wherein the cross section of the profile has a substantially horizontally extending support rib on a side facing towards an interior of the machine.

5. Machine frame according to claim 4, wherein the cross section of the profile has a substantially vertically extending rib adjoining an inner end of the horizontally extending support rib, and/or a substantially vertically extending rib adjoining an outer end of the horizontally extending support rib.

6. Machine frame according to claim 1, wherein the profile has a rib, at its upper end, that extends obliquely downwards and outwards.

7. Machine frame according to claim 1, wherein the support rib and/or the outer vertical rib and/or the lower vertical rib comprise a plurality of mounting holes.

8. Machine frame according claim 1, further comprising at least one stand that extends in a height direction of the machine frame, wherein at least one of the stands is formed by a metal angle plate.

9. Machine frame according to claim 1, wherein at least one connecting element, which serves to connect a support to a stand or another support, is or are manufactured from electrically conductive material.

10. Machine frame according to claim 1, wherein a lower, substantially horizontally extending longitudinal support of the machine frame is arranged so as to be offset, by a predetermined distance, from a longitudinal center of the machine frame.

11. Fastening assembly comprising a machine frame according to claim 7, and at least one fastening element for fastening a functional module to a profile element by engagement in at least one mounting hole, wherein the fastening element comprises at least one hook part having a reach-through portion and a hook portion, wherein the reach-through portion is intended to pass through the mounting hole, and is of a height that is smaller than a height of the mounting hole, wherein the hook portion is intended to engage behind the mounting hole, and is of a predetermined height, wherein a sum of the height of the reach-through portion and the height of the hook portion is greater than the height of the mounting hole, wherein the at least one hook part further comprises a contact surface which is intended to come into contact engagement with a first contact surface of the profile element, wherein the fastening element comprises at least one clamping part which interacts with the at least one hook part and is adjustable relative thereto, between a clamping position and a release position, and wherein the at least one clamping part is intended to come into contact engagement with a second contact surface of the profile element, in the clamping position, in such a way that the contact surface of the at least one hook part comes into contact engagement with the first contact surface of the profile element, and thus secures the engagement of the reach-through portion in the mounting hole and the engagement of the hook portion behind the mounting hole.

12. Fastening assembly according to claim 11, wherein a contact surface is provided on a base part of the at least one fastening element, which contact surface comes into contact engagement with a third contact surface of the profile element.

13. Fastening element according to claim 12, wherein the third contact surface of the profile element is arranged on the same side of the profile element as the second contact surface.

14. Fastening element according to claim 12, wherein the third contact surface of the profile element and the first contact surface are arranged on sides of the mounting hole facing away from one another.

15. Fastening assembly according to claim 11, wherein that the fastening element comprises a plurality of hook parts and/or a plurality of clamping parts.

* * * * *